A. K. WINTER.
SAFE DOOR TRAP.
APPLICATION FILED DEC. 18, 1919.
Reissued Apr. 13, 1920.
14,840.
2 SHEETS—SHEET 1.
Fig. 1.
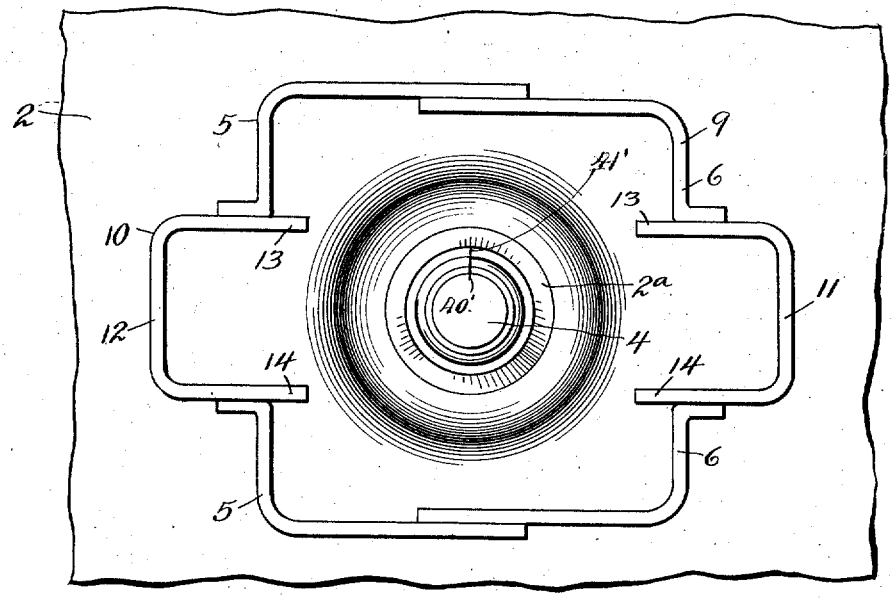
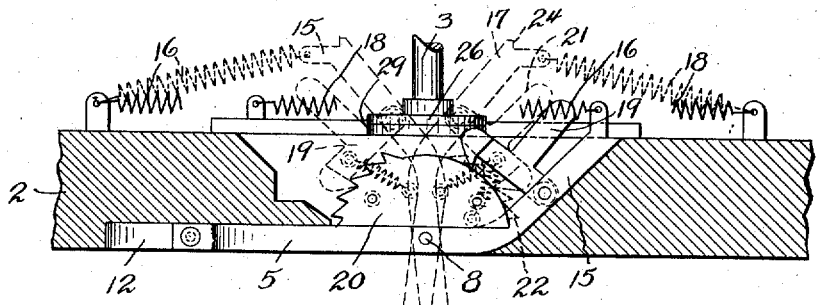
Fig. 2.
Fig. 6.
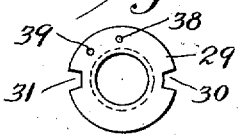
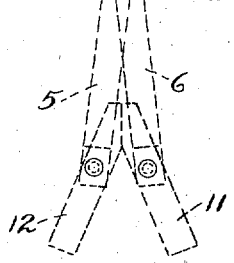
Inventor:
A. K. WINTER
By: Wm. H. Reid.
Attorney

A. K. WINTER.

SAFE DOOR TRAP.

APPLICATION FILED DEC. 18, 1919.

Reissued Apr. 13, 1920. 14,840.

2 SHEETS—SHEET 2.

Inventor:
A. K. WINTER

BY: Wm. H. Reid.
ATTORNEY.

UNITED STATES PATENT OFFICE.

ANNA K. WINTER, OF NEW YORK, N. Y.

SAFE-DOOR TRAP.

14,840. Specification of Reissued Letters Patent. Reissued Apr. 13, 1920.

Original No. 1,321,409, dated November 11, 1919, Serial No. 303,967, filed June 13, 1919. Application for reissue filed December 18, 1919. Serial No. 345,919.

*To all whom it may concern:*

Be it known that I, ANNA K. WINTER, a citizen of the United States, and resident of New York city, in the county and State of New York, have invented certain new and useful Improvements in Safe-Door Traps, of which the following is a specification.

The object of the present invention is to provide a trap in connection with a spindle lock, such as used on safe doors, in which concealed arms or jaws will be released by the turning of the spindle by a person who does not know the proper operation, whereby the jaws will close on the hand or arm of such person, and remain locked in such position until released.

A further object of the invention is to provide an arrangement of this character in which the jaws can be released only from the inner side of the door or member, that is accessible only by some one who knows the combination opening the door.

In the accompanying drawings showing one embodiment of my invention, Figure 1 is a front elevation of the device.

Fig. 2 is a cross section on the line 2—2 of Fig. 4.

Fig. 6 shows the inner disk.

This invention comprises essentially a lock, especially of the spindle type, a pair of jaws normally concealed in the member to be brought together adjacent the spindle, and means whereby the operation of the spindle or lock, except in a certain peculiar manner, will result in the jaws being brought together.

Figure 3:
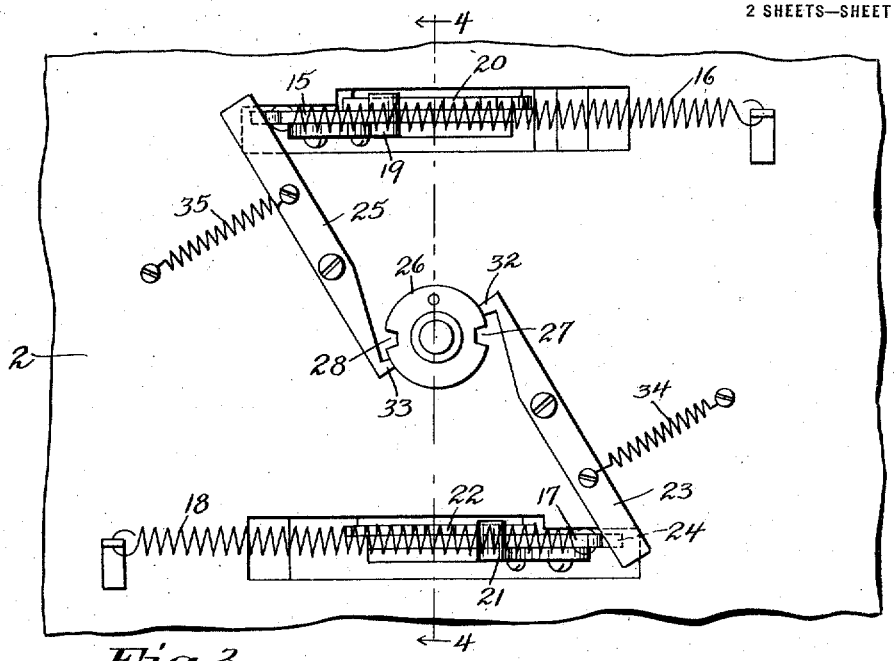
Fig. 3 is a rear elevation.
Figure 4:
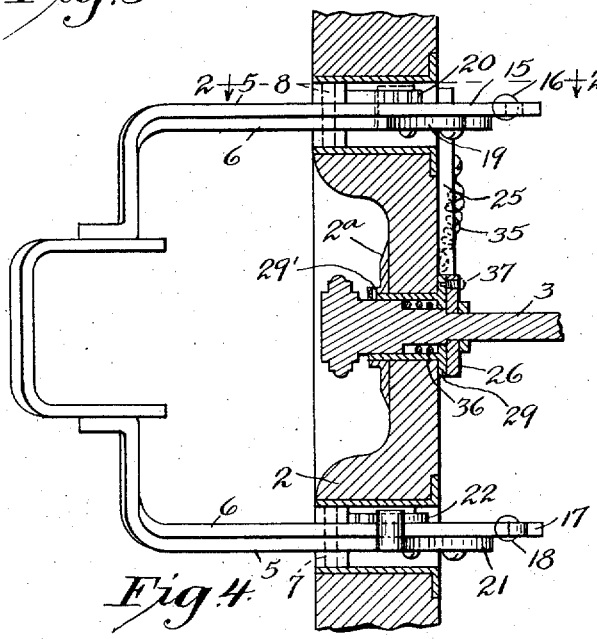
Fig. 4 is a vertical section on line 4—4 of Fig. 3.
Figure 5:
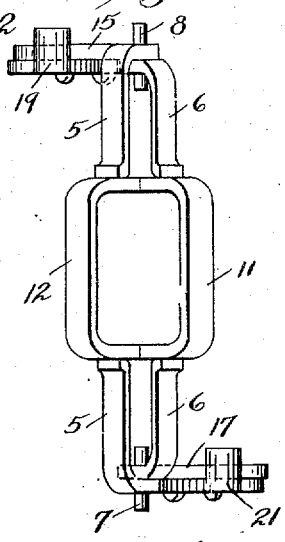
Fig. 5 shows the trap members.

As shown in the drawings, a member 2, that may represent a safe door, is provided with a lock in the form of a spindle 3 controlled by a handle 4, and which rotates in the door. An indicating dial $2^a$ is located in front of said member 2 surrounding the sleeve on the disk 29 and is connected to said disk by pin 29′. It is to be understood that this spindle will operate a combination lock in any well known manner. A pair of jaw members 5 and 6 are hinged together at 7 and 8 to surround the spindle, and are normally concealed in channels 9 and 10 in the door or member. The jaw members are shown provided with bow portions 11 and 12 that serve to surround the wrist or arm of the person to be caught, by engagement of their inner ends 13 and 14, see Fig. 3. The jaw 5 has an extension or arm 15 projecting through the door, and engaged by a coil spring 16 that will serve to swing this arm from the concealed position toward the axis of the spindle 3. The other jaw 6 has a similar arm 17 engaged by a coil spring 18 to swing it toward the axis of the spindle; whereby the jaws are brought from the concealed position to engage the wrist of a person attempting to turn the spindle. Means are provided for locking the jaws in this closed position, shown in the form of a spring pawl 19 carried by the arm 15, that rides over a fixed segment 20 in the door, and prevents reverse movement of the jaw when closed. A similar spring pawl 21 on the other arm 17 engages a fixed segment 22 on the door; whereby the jaws will be locked in their closed position and firmly grasp the wrist or arm of the operator. It will be observed that the pawls are located on the inner side of the door, and when the door is closed are not accessible to release the person caught, until the door is opened, when each pawl can be lifted from its segment and the jaws released.

The jaws are normally retained in the open position by a trip device, that is released on turning the spindle, except upon special manipulation of the spindle. On the inner side of the door is hinged a lever 23, arranged to engage the notched end 24 of the jaw arm 17, and retain the jaw in the open position until the lever is shifted. A similar lever 25 engages the arm 15 to hold the jaw 5 in the concealed open position. The spindle 3 projects through the door and has a disk 26 secured preferably by brazing on its inner portion, that is provided with notches 27 and 28 at opposite portions. A second disk 29 turns free on the spindle 3, and has notches 30 and 31, that on turning this disk will register respectively with the notches 27 and 28. The inner ends of the levers 23 and 25 are provided with lugs 32 and 33, that are caused, by coil springs 34 and 35, on the levers, to be pressed into the registering notches of the two disks upon turning the spindle and disks to such a relative position. But in any other relative position of the disks, except when their notches register and are located directly opposite these lugs, the springs will press the lugs on the levers against the peripheries of the disks. This will retain the levers in the described positions in which they will serve to hold the respective jaw members in the open or concealed positions. Normally the spindle is set in this manner, so that when turned in either direction by the handle to bring the registering notches of the two disks opposite the lugs, the coil springs on the levers will swing the levers to release the jaws, and the coil springs on the jaws will at once close the jaws on the arm of the person turning the spindle. It will be understood that the two pawls will lock the jaws in this arresting position, and the jaws can only be released by swinging one or both of the pawls, when access is had to the inner side of the door. Means are provided for locking the loose disk 29 to the other disk 26 carried by the spindle, and releasing them, at the will of the operator. A coil spring 36 between shoulder 40 on spindle 3 and a flange 41 on sleeve 42, serves to press the spindle outwardly and hold the disks together, and cause a stud 37 on the disk 26 to enter recesses 38 or 39 in the disk 29. By pressing inwardly on the handle 4, the stud will release the inner disk and the disks may be turned relatively, so that this stud can be caused to enter either of these recesses. The latter are so arranged that when the stud is in the recess 38 the disks have their peripheral pairs of notches in register; and upon pressing inward on the spindle this relative position of the disk is changed and the stud can be brought to enter the recess 39, which will lock the disks together with their notches out of register.

A mark can be placed on the handle as at 40′, and marks placed on the dial as at 41′, to indicate the relative positions of the disks.

In the operation of the device the disks are positioned with their notches out of register with the lever lugs, that will hold the levers in position to engage the jaws and retain them in the open and concealed position. The disks are manipulated by the spindle so that they are brought with their pair of notches registering, but not adjacent the lugs on the levers. This is the set position of the device, and any person not understanding the proper operation, on turning the spindle and handle for not more than a half turn, will bring the registering notches to engage the lugs on the levers that will spring into the notches and release the jaws, and the latter will at once close on the operator. The door being closed, the pawls will hold the jaws in the closed position and can not be released until the door is opened. But a person understanding the operation, will first push the spindle inwardly and then give it a turn to bring the marks to register, and can readily ascertain that the stud on the inner disk will enter the other disk recess and thus lock the disks together with their pairs of notches out of register. The correct amount of turn or turns necessary to operate the lock is easily determined by the clicks of the combination lock, there being no positive connection between the front dial and the inner disk 26. Thereupon the spindle can be given any number of turns in either direction, and since the lugs 32 and 33 are wide enough to ride on the edge of both disks, they can not enter either of the notches and hence the levers can not swing. It is only by bringing the pairs of notches to register that the lugs will enter such notches and shift the levers. When a person has been trapped by the jaws, the person knowing the combination will operate the spindle by pushing in on the handle and inner disk and turning it in the inward position through the proper combination, that will permit the door to be opened. Then the pawls can be pulled back to free the jaws and the person caught will be released.

What I claim is:—

1. The combination with a member having a lock, of a pair of jaws normally concealed in the member, means arranged to swing the jaws together at a position adjacent the lock, and means arranged to retain the jaws in the said concealed position to be released by the attempt to operate the lock, whereby the jaws will close adjacent the lock to trap the operator.

2. The combination with a member having a lock, of a pair of jaws normally concealed in the member, means arranged to swing the jaws together at a position adjacent the lock, means arranged to retain the jaws in the said concealed position to be released by the attempt to operate the lock, whereby the jaws will close adjacent the lock to trap the operator, and means for locking the jaws together in the closed position.

3. The combination with a member having a lock, of a pair of jaws normally concealed in the member, means arranged to swing the jaws together at a position adjacent the lock, means arranged to retain the jaws in the said concealed position to be released by the attempt to operate the lock, whereby the jaws will close adjacent the lock to trap the operator, and means for locking the jaws together in the closed position which means are concealed in the member for release on the opposite side of the member from which the jaws operate.

4. The combination of a member having a lock, the member having an annular channel surrounding the lock, a pair of jaws hinged together and normally concealed in said channel in the member, springs on the jaws arranged to swing them together at the position adjacent the lock, and means arranged to retain the jaws under tension in said member channel that are released by the attempt to operate the lock, whereby the springs will close the jaws adjacent the lock to trap the operator.

5. The combination of a member having a lock, the member having an annular channel surrounding the lock, a pair of jaws hinged together and normally concealed in said channel in the member, springs on the jaws arranged to swing them together at a position adjacent the lock, means arranged to retain the jaws under tension in said member channel that are released by the attempt to operate the lock, whereby the springs will close the jaws adjacent the lock to trap the operator, and means arranged to engage the jaw members to lock them in the closed position, which means are releasable from the face of the member opposite the said channeled face.

6. The combination with a member having a spindle lock, of a pair of jaws normally concealed in the member, means arranged to swing the jaws together at a position adjacent the spindle, means arranged to retain the jaws in the said concealed position to be released by the attempt to turn the spindle, whereby the jaws will close adjacent the spindle to trap the operator, and means for locking the jaws together in the closed position.

7. The combination with a member having a spindle lock, of a pair of jaws normally concealed in the member, means arranged to swing the jaws together at a position adjacent the spindle, means arranged to retain the jaws in the said concealed position to be released by the attempt to turn the spindle, whereby the jaws will close adjacent the spindle to trap the operator, and means for locking the jaws together in the closed position which means are concealed in the member for release on the opposite side of the member from which the spindle and jaws operate.

8. The combination of a member having a spindle lock, the member having an annular channel surrounding the lock, a pair of jaws hinged together and normally concealed in said channel in the member, springs on the jaws arranged to swing them together at a position adjacent the spindle end, and means arranged to retain the jaws under tension in said member channel that are released by the attempt to turn the spindle lock, whereby the springs will close the jaws adjacent the spindle to trap the operator.

9. The combination of a member having a spindle lock, the member having an annular channel surrounding the lock, a pair of jaws hinged together and normally concealed in said channel in the member, springs on the jaws arranged to swing them together at a position adjacent the spindle end, and means arranged to retain the jaws under tension in said member channel that are released by the attempt to turn the spindle lock, whereby the springs will close the jaws adjacent the spindle to trap the operator, and means to lock the jaws closed that are on the opposite side of the member from the spindle exposed end.

10. In a spindle lock trap, a rotatable spindle, a rotatable lock member, a disk secured to the lock member and having a notch in its edge, said disk being rotatable on the spindle, a second disk fast to the spindle and having a notch in its edge, means for securing said disk together with their notches in register, and releasable by axial movement of the spindle to permit the spindle to turn the disks relatively, and means for securing the disks together with said notches out of register and releasable by axial movement of the spindle, a pair of trap arms hinged to swing together adjacent the spindle, springs arranged to swing the arms together, a trip bar arranged to hold the arms in open position, said bar engaging said two disks on their edge to normally retain the arms open, and to enter said disk notches on rotation thereof with the recesses in register, whereby to release the trap arms to close.

11. In a spindle lock trap, a rotatable spindle, a rotatable lock member, a disk secured to the lock member and having a notch in its edge, said disk being rotatable on the spindle, a second disk fast to the spindle and having a notch in its edge, means for securing said disks together with their notches in register, and releasable by axial movement of the spindle to permit the spindle to turn the disks relatively, means for securing the disks together with said notches out of register and releasable by axial movement of the spindle, a spring to retain the disks secured together, a pair of trap arms hinged to swing together adjacent the spindle, springs arranged to swing the arms together, and a trip bar arranged to hold the arms in open position, said bar engaging said two disks on their edge to normally retain the arms open, and to enter said disk notches on rotation thereof with the recesses in register, whereby to release the trap arms to close.

12. In a spindle lock trap, a rotatable spindle, a rotatable lock member, a disk secured to the lock member and having a notch in its edge, said disk being rotatable on the spindle, a second disk fast to the spindle and having a recess in its edge, a pin on one disk, the other disk having a recess engaging said pin to retain said disks in engagement with their said recesses in register, said engaging means being released by axial movement of the spindle to turn the disks relatively, said disk having a second recess to engage said pin for securing the disks together with said notches out of register, a pair of trap arms hinged to swing together adjacent the spindle, springs arranged to swing the arms together, and a trip bar arranged to hold the arms in open position, said bar engaging said two disks on their edge to normally retain the arms open, and to enter both said disk notches on rotation thereof with the recesses in register, whereby to release the trap arms to close.

13. In a spindle lock trap, a rotatable spindle, a rotatable lock member, a disk secured to the lock member and having a notch in its edge, said disk being rotatable on the spindle, a second disk fast to the spindle and having a recess in its edge, a pin on one disk, the other disk having a recess engaging said pin to retain said disks in engagement with their said recesses in register, said engaging means being released by axial movement of the spindle to turn the disks relatively, said disks having a second recess to engage said pin for securing the disks together with said notches out of register, a spring to hold the disks together with the pin in either of said recesses, a pair of trap arms hinged to swing together adjacent the spindle, springs arranged to swing the arms together, and a trip bar arranged to hold the arms in open position, said bar engaging said two disks on their edge to normally retain the arms open, and to enter both said disk notches on rotation thereof with the recesses in register, whereby to release the trap arms to close.

14. In a spindle trap lock, a rotatable spindle, a rotatable lock member, a disk secured to the lock member and having a pair of notches in its edge, said disk being rotatable on the spindle, a second disk fast to the spindle and having a pair of notches in its edge that can register respectively with said other disk notches, a pin on one disk, the other disk having a recess engaging said pin to retain the disks in engagement with their said notches in register in pairs, said engaging means being released by axial movement of the spindle, said second disk having a second recess arranged to engage said pin to secure the disks together with said notches out of register, a pair of trap arms hinged to swing together adjacent the spindle, springs arranged to swing the arms together, a pair of trip bars, a spring on each bar arranged to cause each bar to engage both said disk edges to normally retain the trap arms in open position, and which bars on rotation of the disks with their said recesses in register will enter the recesses whereby to release the trap arms to close.

15. In a spindle lock trap, a rotatable spindle, a rotatable lock member, a disk secured to the lock member and having a notch in its edge, said disk being rotatable on the spindle, a second disk fast to the spindle and having a notch in its edge, means for securing said disks together with their notches in register, and releasable by axial movement of the spindle to permit the spindle to turn the disks relatively, means for securing the disks together with said notches out of register and releasable by axial movement of the spindle, a pair of trap arms hinged to swing together adjacent the spindle, springs arranged to swing the arms together, a trip bar arranged to hold the arms in open position, said bar engaging said two disks on their edge to normally retain the arms open, and to enter said disk notches on rotation thereof with the recesses in register, whereby to release the trap arms to close, and means to indicate said engaging positions of the disks.

16. The combination of a member having a spindle lock, the member having an annular channel surrounding the lock, a pair of jaws hinged together and normally concealed in said channel in the member, springs on the jaws arranged to swing them together at a position adjacent the spindle end, and means arranged to retain the jaws under tension in said member channel that are released by the attempt to turn the spindle lock, whereby the springs will close the jaws adjacent the spindle to trap the operator, a pawl on each jaw, and toothed segments on the opposite side of the member from the spindle exposed end, that engage said pawls respectively to lock the jaws in closed position.

17. A trap comprising a pair of hinged jaws each provided with supplemental jaw members adapted to swing backward relatively to the jaws upon engagement with an object.

18. A trap comprising a pair of hinged jaws each provided with pivoted supplemental jaw members which are adapted to swing backward relatively to the jaws upon engagement with an object, said supplemental jaw members having fingers extending from the pivot points of the members away from the main bodies of the latter.

Signed at New York city, N. Y., on June 12, 1919.

ANNA K. WINTER.